United States Patent
Elshaer et al.

(10) Patent No.: US 11,021,069 B1
(45) Date of Patent: Jun. 1, 2021

(54) MULTISOURCE MAGNETIC INTEGRATION USING A CURRENT SOURCE FED TRANSFORMER STRUCTURE WITH DECOUPLED SECONDARY WINDINGS

(71) Applicant: Ford Global Technologies, LLC, Dearborn, MI (US)

(72) Inventors: Mohamed Elshaer, Canton, MI (US); Chingchi Chen, Ann Arbor, MI (US); Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/777,593

(22) Filed: Jan. 30, 2020

(51) Int. Cl.
*H02M 1/42* (2007.01)
*B60L 50/60* (2019.01)
*H01F 27/28* (2006.01)
*H02M 3/335* (2006.01)

(52) U.S. Cl.
CPC .............. *B60L 50/60* (2019.02); *H01F 27/28* (2013.01); *H02M 3/33561* (2013.01); *H02M 3/33576* (2013.01); *B60L 2210/30* (2013.01); *B60L 2210/40* (2013.01)

(58) Field of Classification Search
None
See application file for complete search history.

(56) References Cited

U.S. PATENT DOCUMENTS

| | | | |
|---|---|---|---|
| 10,439,575 B1* | 10/2019 | Kuo | H03F 3/195 |
| 10,696,182 B2* | 6/2020 | Khaligh | H01F 3/14 |
| 2010/0008108 A1* | 1/2010 | Xiaowu | H02M 3/33523 |
| | | | 363/21.15 |
| 2011/0254379 A1* | 10/2011 | Madawala | H02J 5/005 |
| | | | 307/104 |
| 2018/0222333 A1 | 8/2018 | Khaligh et al. | |
| 2019/0280586 A1* | 9/2019 | Chen | H02M 7/4807 |

FOREIGN PATENT DOCUMENTS

| | | |
|---|---|---|
| CN | 101262140 B | 6/2010 |
| CN | 103580252 B | 12/2015 |

* cited by examiner

*Primary Examiner* — Jared Fureman
*Assistant Examiner* — Esayas G Yeshaw
(74) *Attorney, Agent, or Firm* — David B. Kelley; Brooks Kushman P.C.

(57) ABSTRACT

A power system for an automotive vehicle includes a matrix transformer having two separate cores, a primary winding wound around each of the cores, a first secondary winding wound around one of the cores, and a second secondary winding galvanically isolated from the first secondary winding and wound around the other of the cores. The power system also includes circuitry that transfers power from an AC source to the primary winding, transfers power from the first secondary winding to a traction battery, and transfers power from the second secondary winding to an auxiliary battery.

14 Claims, 10 Drawing Sheets

MULTISOURCE MAGNETIC INTEGRATION USING A CURRENT SOURCE FED TRANSFORMER STRUCTURE WITH DECOUPLED SECONDARY WINDINGS

TECHNICAL FIELD

This disclosure relates to automotive power electronics components.

BACKGROUND

An electric or hybrid vehicle may contain one or more motors for propulsion. The vehicle may also contain a traction battery to provide energy for the motor and an auxiliary battery to support low voltage loads. As the motor, traction battery, and auxiliary battery may require different electrical parameters, electrical communication between them may require modification of the power provided or consumed.

SUMMARY

An automotive power system includes a traction battery, an auxiliary battery, and a matrix transformer with two separate cores, a primary winding wound around each of the cores, a first secondary winding wound around one of the cores, and a second secondary winding galvanically isolated from the first secondary winding and wound around the other of the cores. The system also includes circuitry that transfers power from an AC source to the primary winding, to transfer power from the first secondary winding to the traction battery, and to transfer power from the second secondary winding to the auxiliary battery. The circuitry includes a first active bridge having a switching frequency range, and a pair of series connected capacitors and an inductor center tapping the capacitors to form a capacitor-inductor-capacitor resonant network electrically connected between the first active bridge and primary winding and tuned to have a resonant frequency defined by the switching frequency range. The system further includes a controller that operates the first active bridge to maintain a magnitude of current through the primary winding constant independent of load variation at the first and second secondary windings.

An automotive power system includes a traction battery, an auxiliary battery, and a matrix transformer with two separate cores, a primary winding wound around each of the cores, a first secondary winding wound around one of the cores, and a second secondary winding galvanically isolated from the first secondary winding and wound around the other of the cores. The system also includes primary circuitry that transfers power from an AC source to the primary winding, first secondary circuitry that transfers power from the first secondary winding to the traction battery, and second secondary circuitry that transfers power from the second secondary winding to the auxiliary battery. The second secondary circuitry includes a center tapped active bridge, a resonant capacitor, and an inductor-capacitor low pass filter that matches an output impedance of the center tapped active bridge to an input impedance of the inductor-capacitor low pass filter. The resonant capacitor is electrically connected in parallel with the inductor-capacitor low pass filter at a center tap of the center tapped active bridge such that under zero load conditions at the second secondary winding, current through the second secondary winding and the center tapped active bridge is greater than zero.

An automotive power system has a traction battery, an auxiliary battery, and a matrix transformer with two separate cores, a primary winding wound around each of the cores, a first secondary winding wound around one of the cores, and a second secondary winding galvanically isolated from the first secondary winding and wound around the other of the cores. The system also has circuitry, that transfers power from an AC source to the primary winding, including a bidirectional inverter, a first active bridge having a switching frequency range, a DC link capacitor between the bidirectional inverter and first active bridge, and a pair of series connected capacitors and an inductor center tapping the capacitors to form a capacitor-inductor-capacitor resonant network electrically connected between the first active bridge and primary winding and tuned to have a resonant frequency defined by the switching frequency range. The system also has a controller that operates the first active bridge to maintain a magnitude of current through the primary winding constant independent of load variation at the first and second secondary windings, and circuitry, that transfers power from the first secondary winding to the traction battery, including a second active bridge, a DC output filter capacitor, and matching network circuitry configured to match an output impedance of the matrix transformer to an input impedance of the second active bridge. The system further has circuitry, that transfers power from the second secondary winding to the auxiliary battery, including a third active bridge, a resonant capacitor, and an inductor-capacitor low pass filter configured to match an output impedance of the third active bridge to an input impedance of the inductor-capacitor low pass filter. The third active bridge is a center tapped active bridge. The resonant capacitor is electrically connected in parallel with the inductor-capacitor low pass filter at a center tap of the center tapped active bridge such that under zero load conditions at the second secondary winding, current through the second secondary winding and the center tapped active bridge is greater than zero to permit the controller to maintain the magnitude of current through the primary winding constant independent of load variation at the first and second secondary windings.

BRIEF DESCRIPTION OF THE DRAWINGS

In FIG. 5A, power to the high voltage battery is 10 kW and power to the low voltage battery is 2 kW. In FIG. 5B, power to the high voltage battery is 10 kW and power to the low voltage battery is 0 kW.

In FIG. 7A, power to the high voltage battery is 10 kW and power to the low voltage battery is 1 kW. In FIG. 7B, power to the high voltage battery is 10 kW and power to the low voltage battery is 0 kW.

In FIG. 8A, power to the high voltage battery is 10 kW and power to the low voltage battery is 1 kW. In FIG. 8B, power to the high voltage battery is 10 kW and power to the low voltage battery is 0 kW.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Introduction

New circuit topologies and transformer structures are proposed herein to serve the purpose of regulating power flow among three power sources: an AC source, a high voltage (HV) battery, and a low voltage (LV) battery. Efficient magnetic coupling among these sources is achieved by a current source fed transformer structure with decoupled secondary windings. This circuit enables grid-to-vehicle (G2V) and vehicle-to-grid (V2G) bidirectional power transfer operations while charging the LV (auxiliary) battery. Additionally, in the case when the AC grid is absent, this circuit can be used as an onboard generator for supplying power to AC loads connected to the vehicle. Changing between these modes does not require relays or switching devices to reconfigure the circuit.

Figure 1:
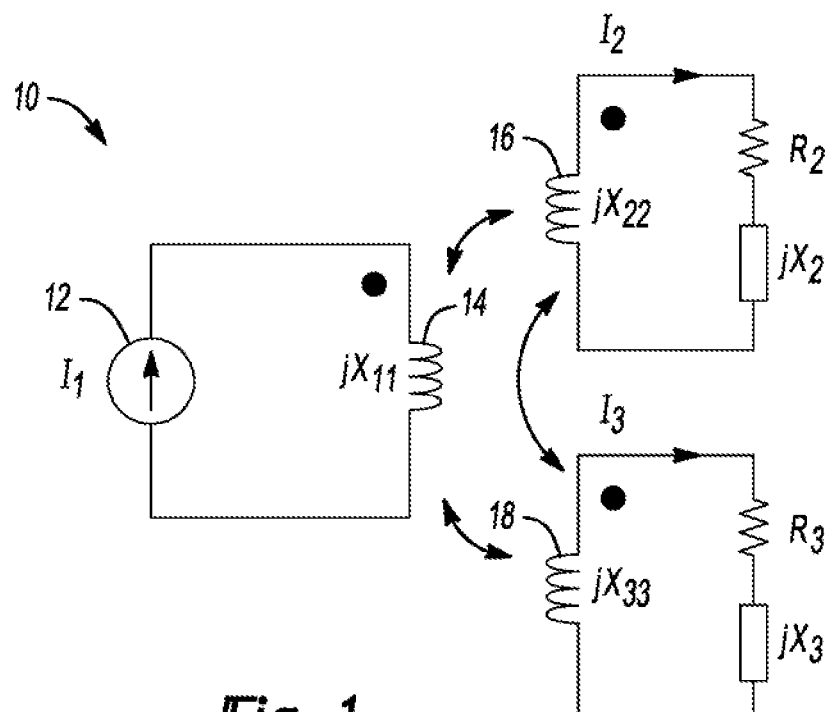
FIG. 1 is a simplified circuit model.

To illustrate the issue, a simplified equivalent circuit model 10 is created, as shown in FIG. 1. A current source 12 models the circuit driving a primary winding 14, and equivalent impedances model the circuits loading the secondary windings 16, 18. From this circuit, the power delivered to the winding 16, P2, and the winding 18, P3, is expressed by eq. 1 and eq. 2, respectively.

$$P_2 = \frac{X_{12} I_1 I_2}{2} \cos\left(\theta_1 - \theta_2 - \frac{\pi}{2}\right) + \frac{X_{23} I_2 I_3}{2} \cos\left(\theta_3 - \theta_2 - \frac{\pi}{2}\right) \quad (1)$$

$$P_3 = \frac{X_{13} I_1 I_3}{2} \cos\left(\theta_1 - \theta_3 - \frac{\pi}{2}\right) + \frac{X_{23} I_2 I_3}{2} \cos\left(\theta_2 - \theta_3 - \frac{\pi}{2}\right) \quad (2)$$

Where $X_{11}$ is the self-reactance of the primary winding 14, $X_{22}$ and $X_{33}$ are the self-reactances of the secondary windings 16, 18 respectively, $R_2$ and $R_3$ are the real components of the equivalent impedances loading the secondary windings 16, 18 respectively, $X_2$ and $X_3$ are the imaginary components of the equivalent impedances loading the secondary windings 16, 18 respectively, $X_{12}$, $X_{13}$, and $X_{23}$ are the mutual reactances between the primary and secondary windings 14, 16, the primary and secondary windings 14, 18, and the secondary windings 16, 18 respectively, and $\theta_1$, $\theta_2$, and $\theta_3$ are the phases of the currents $I_1$, $I_2$, and $I_3$ respectively. Thus, power delivered to the winding 16 is dependent on the magnitude and phase of current through the winding 18. Load variation in the winding 18 will impact the power delivered to the winding 16. Similarly, load variation in the winding 16 will impact the power delivered to the winding 18. Due to such inherent coupling between all the windings 14, 16, 18, independent power regulation at each of the secondary windings 16, 18 is challenging.

As mentioned above, the proposed circuit topology and transformer structure are designed to regulate power flow among three sources: AC source/load, HV battery, and LV battery. The main power transformer is constructed by using two separate cores. Thus, the magnetic flux generated in the first core is decoupled/galvanically isolated from the flux generated in the second core. The transformer primary winding is wound around both cores and connected to a capacitor-inductor-capacitor (CLC) network. A secondary coil is wound around one of the cores and connected to a zero voltage switching (ZVS) resonant buck converter via their center tap point to realize bidirectional power flow from the LV battery. Another secondary winding is wound around the other of the cores and connected to a series inductor-capacitor (LC) network. By using two H-bridge inverters—one at the grid DC bus side and the other at the HV battery side—bidirectional power flow between the AC grid and HV traction battery is realized.

Specific Example

Figure 2:
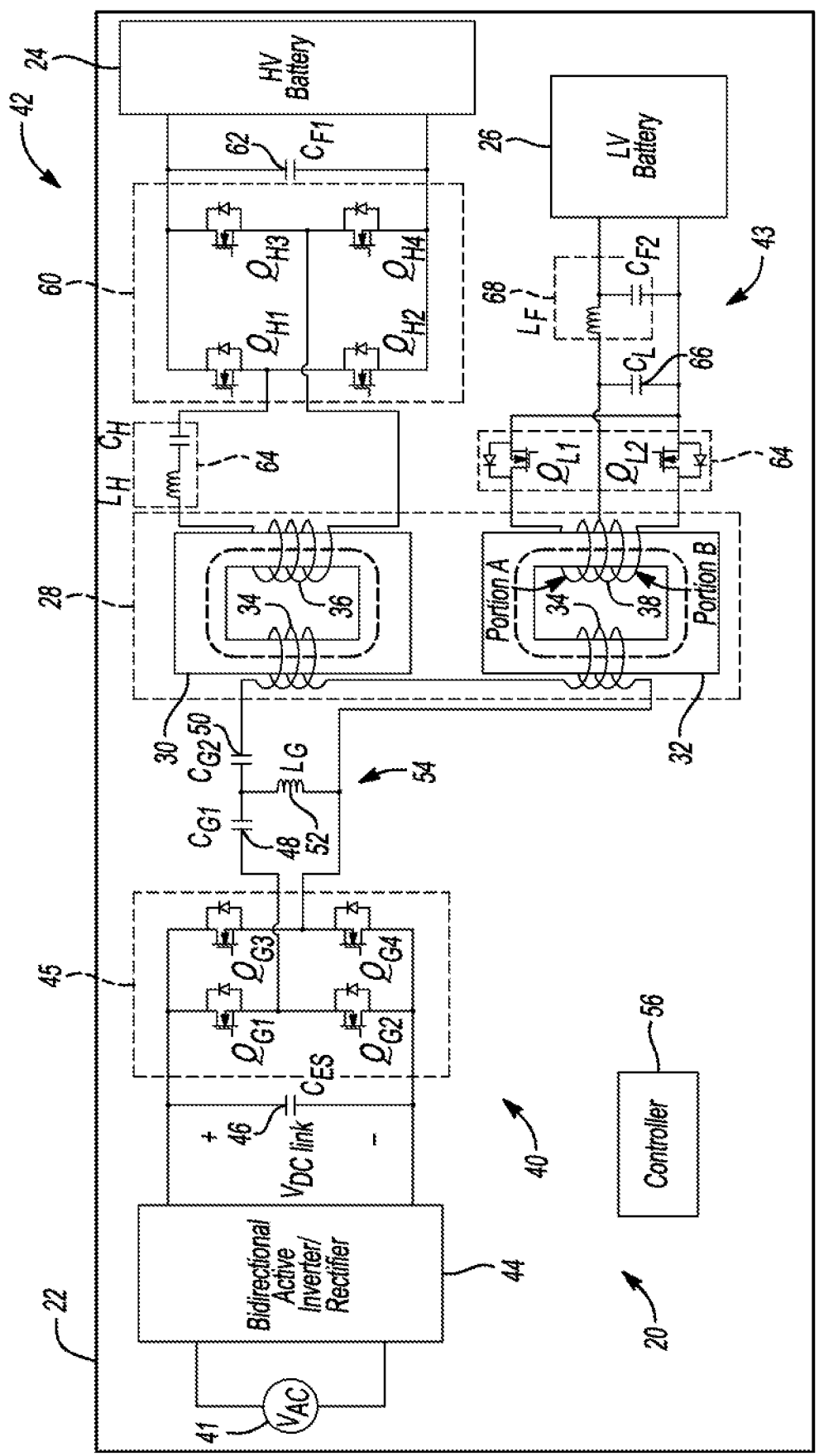
FIG. 2 is a circuit schematic for a proposed integrated charger/generator.

With reference to FIG. 2, an example power system 20 for a vehicle 22 includes a traction battery 24, an auxiliary battery 26, and a matrix transformer 28. The matrix transformer 28 includes two separate cores 30, 32, a primary winding 34 wound around each of the cores 30, 32, a first secondary winding 36 wound around the core 30, and a second secondary winding 38 (including portions A and B) galvanically isolated from the first secondary winding 36 and wound around the core 32. The power system 20 also includes circuitry 40 that transfers power from an AC source 41 to the primary winding 34, circuitry 42 that transfers power from the first secondary winding 36 to the traction battery 24, and circuitry 43 that transfers power from the second secondary winding 38 to the auxiliary battery 26.

The circuitry 40 includes a bidirectional inverter 44, a first active bridge 45 having a switching frequency range (e.g., 200 to 400 kHz) and a plurality of switches $Q_{G1}$, $Q_{G2}$, $Q_{G3}$, $Q_{G4}$, a DC link capacitor 46 ($C_{ES}$) between the bidirectional inverter 44 and first active bridge 45, and a pair of series connected capacitors 48 ($C_{G1}$), 50 ($C_{G2}$) and an inductor 52 ($L_G$) center tapping the capacitors 48, 50 to form a capacitor-inductor-capacitor (CLC) resonant network 54 electrically connected between the first active bridge 45 and primary winding 34 and tuned to have a resonant frequency defined by the switching frequency range. For example, the CLC resonant frequency could be between 190 and 410 kHz assuming the switching frequency range of the first active bridge 45 is 200 to 400 kHz. The CLC resonant frequency could also be 0.5 to 1.5 times the nominal switching frequency range of the first active bridge 45, etc.

The power system 20 also includes a controller 56 that operates the first active bridge 45 to maintain a magnitude of current through the primary winding 34 constant independent of load variation at the first and second secondary windings 36, 38 as discussed more below. The controller further operates the second and third active bridges 60, 64 such that a delay time between pulse width modulated gate signals of the second active bridge 60 and pulse width modulated gate signals of the first active bridge 45 is independent of a delay time between pulse width modulated gate signals of the third active bridge 64 and the pulse width modulated gate signals of the first active bridge 45.

The circuitry 42 includes a second active bridge 60 having a plurality of switches $Q_{H1}$, $Q_{H2}$, $Q_{H3}$, $Q_{H4}$, a DC output filter capacitor 62 ($C_{F1}$), and matching network circuitry 64 ($L_H$, $C_H$) that matches an output impedance of the matrix transformer 28 to an input impedance of the second active bridge 60.

The circuitry 43 includes a third active bridge 64 having a plurality of switches $Q_{L1}$, $Q_{L2}$, a resonant capacitor 66 ($C_L$), and an inductor-capacitor low pass filter 68 ($L_F$, $C_{F2}$) that matches an output impedance of the third active bridge 64 to an input impedance of the inductor-capacitor low pass filter 68. The third active bridge 64 in this example is a center tapped active bridge (the center tap is between portions A and B). The resonant capacitor 66 is electrically connected in parallel with the inductor-capacitor low pass filter 68 at a center tap of the center tapped active bridge 64 such that under zero load conditions at the second secondary winding 38, current through the second secondary winding 38 and the center tapped active bridge 64 is greater than zero to permit the controller 56 to maintain the magnitude of current through the primary winding 34 constant independent of load variation at the first and second secondary windings 36, 38.

As discussed more below, the resonant capacitor 62 is tuned to resonate with the inductor-capacitor low pass filter 68 such that a load impedance of the third active bridge 64 is capacitive during operation of the third active bridge 64 within the switching frequency range.

General Discussion

To decouple the interaction between the secondary coils 36, 38 (i.e., coil 2 and coil 3 respectively) of proposed designs, the core is designed such that the mutual reactance between the secondary coils 36, 38, $X_{23}$, is zero. This is achieved by winding coil 2 and coil 3 in the separate cores 30, 32 as in the example of FIG. 2. Hence, eq. 1 and eq. 2 can be expressed as in eq. 3 and eq. 4. Since the CLC resonant tank 54 maintains a relatively constant current circulation in the primary winding 34, the current through the primary winding 34, $I_1$, in eq. 3 and eq. 4 is constant. Hence, the power delivered to each of the secondary coils 36, 38, $P_2$, $P_3$ respectively, depends only on the magnitude and phase of the current circulating in them.

$$P_2 = \frac{X_{12}I_1I_2}{2}\cos\left(\theta_1 - \theta_2 - \frac{\pi}{2}\right) \quad (3)$$

$$P_3 = \frac{X_{13}I_1I_3}{2}\cos\left(\theta_1 - \theta_3 - \frac{\pi}{2}\right) \quad (4)$$

Where $X_{12}$ and $X_{13}$ are the mutual reactances between the primary and secondary windings 34, 36 and the primary and secondary windings 34, 38 respectively, I2 and I3 are the currents through the secondary windings 34, 36 respectively, and $\theta_1$, $\theta_2$, and $\theta_3$ are the phases of the currents $I_1$, $I_2$, and $I_3$ respectively.

Power delivered to the secondary coils 36, 38 is regulated by controlling the reactance mismatch between the secondary winding self-reactance and its load reactance. The phase difference between the primary coil current and coil 2 and coil 3 currents is described by eq. 5 and eq. 6. By controlling $\Delta X\_2$ and $\Delta X\_3$, the current in coil 2 and coil 3 is altered and effectively the power delivered to them is controlled.

$$\theta_1 - \theta_2 = \frac{\pi}{2} + \sin^{-1}\left(\frac{I_2 \Delta X_2}{I_1 X_{12}}\right), \text{ where } \Delta X_2 = X_{22} + X_2 \quad (5)$$

$$\theta_1 - \theta_3 = \frac{\pi}{2} + \sin^{-1}\left(\frac{I_3 \Delta X_3}{I_1 X_{13}}\right), \text{ where } \Delta X_3 = X_{33} + X_3 \quad (6)$$

A relatively constant current source drives the transformer primary winding 34. The CLC network 54 creates a resonant tank where the current magnitude in the primary winding is less sensitive to the variation in power delivered/received to either the HV battery 24 or LV battery 26. Additionally, the series LC network 64 is used to match the reactance of the secondary winding 36 connected to the HV battery 24. Furthermore, the reactance of the winding 38 connected to the LV battery 26 is matched by the parallel resonant capacitor 66 connected between the LV switches 64 and output low pass filter 68.

Figure 3:
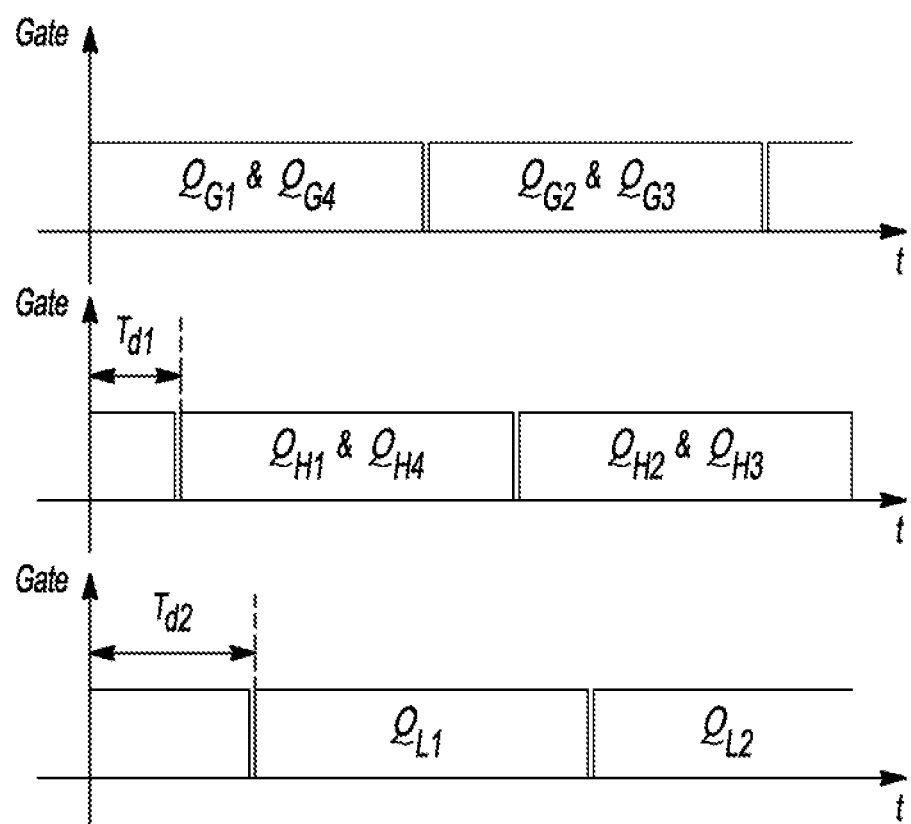
FIG. 3 is a schematic diagram of switch gate pulse timing.

Power regulation is realized by controlling the voltage phase angle between the inverter output voltages and each of the active rectifiers input voltages. FIG. 3 shows the pulse width modulated (PWM) gate signal provided to all switches. The grid-side H-bridge 45 is driven with a fixed frequency pulses such that its output voltage is a square wave. Pulses provided to the battery side H-bridge 60 is delayed from the grid-side H-bridge pulses by a time $T_{d1}$. This time is controlled to regulate the power delivered to the HV battery 24. Similarly, pulses provided to the resonant buck converter 64 are delayed form the grid-side H-bridge pulse by a time $T_{d2}$. This time is controlled to regulate the power delivered to the LV battery 26. The circuit is designed such that the HV battery 24 is independently controlled by $T_{d1}$ and the LV battery 26 is independently controlled by $T_{d2}$. Thus, $T_{d1}$ and $T_{d2}$ are independent of each other.

Figure 4:
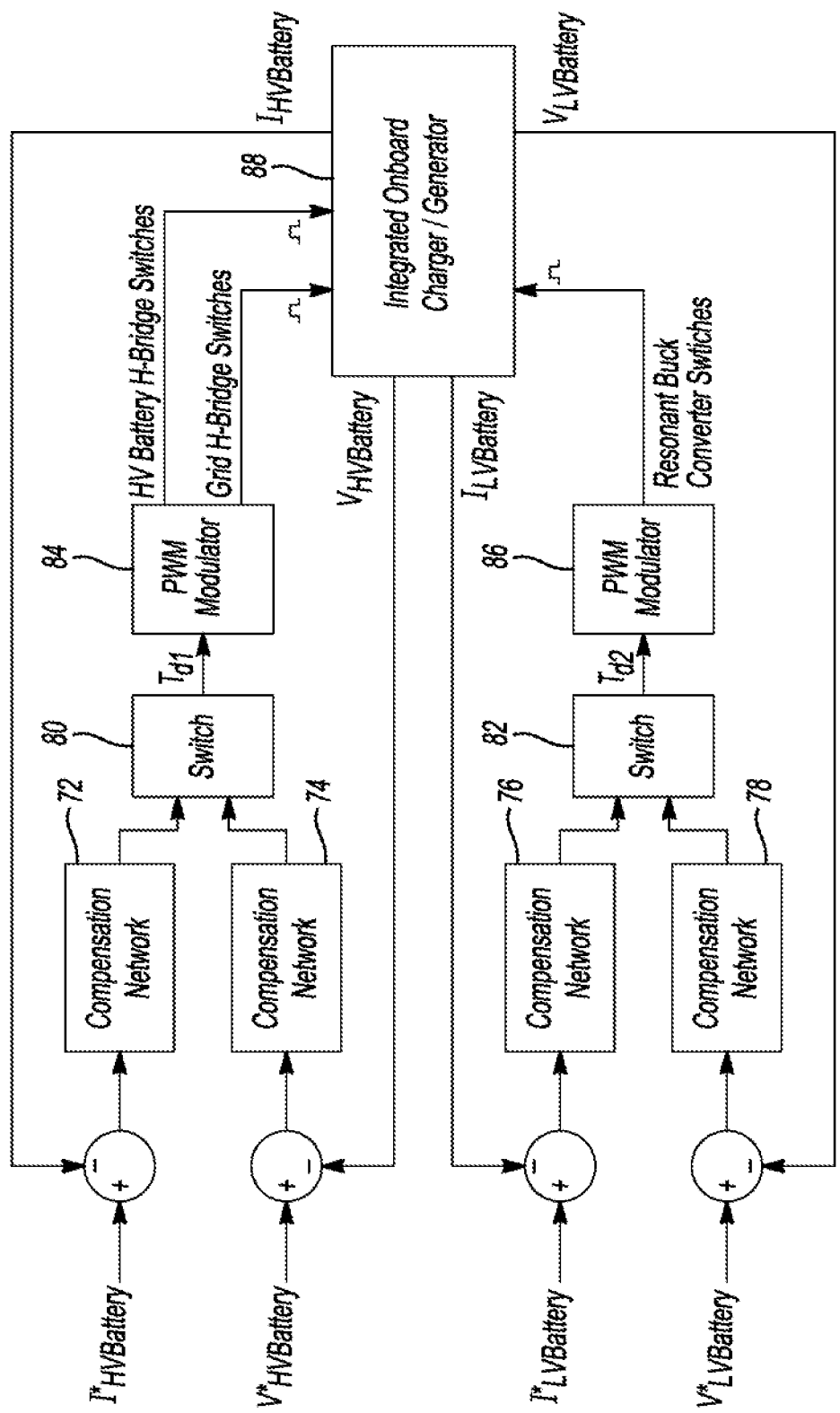
FIG. 4 is a schematic diagram of a controller implementation.

Power delivered to the batteries 24, 26 is regulated by either controlling the charger current magnitude or battery voltage. FIG. 4 shows the block diagram for one possible controller implementation. Compensation networks 72, 74, 76, 78 are used to minimize the error between the reference and the measured feedback signals. Switches 80 82 are used to switch between current control mode and voltage control mode. PWM modulators 84, 86 receive output from the switches 80, 82 respectively. And the PWM modulators 84, 86 provide PWM commands to integrated on board charger/generator 88 accordingly. In the case of HV battery control, the compensation networks 72, 74 and switch 80 output reference singles to set the required delay time $T_{d1}$. Similar controller architecture is realized for the LV battery controller, in which case the compensation networks 76, 78 and switch 82 set the delay time $T_{d2}$. In the case when power is reversed and the HV battery 24 is the source, current and voltage of the DC-link bus are controlled with a controller architecture similar to what is shown in FIG. 4.

Figure 5A:
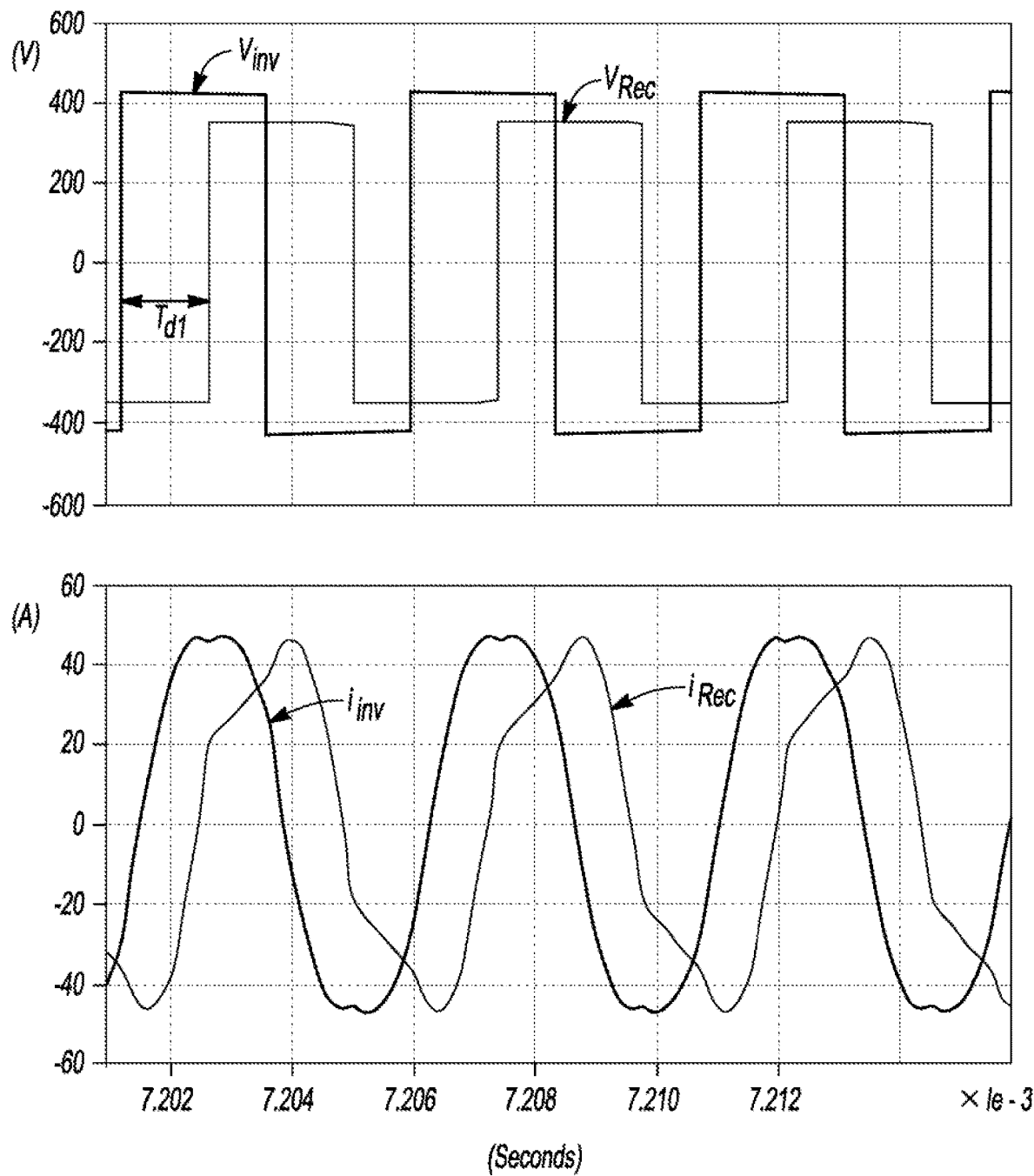
FIGS. 5A and 5B are plots of dual active bridge voltage and current versus time.
Figure 5B:
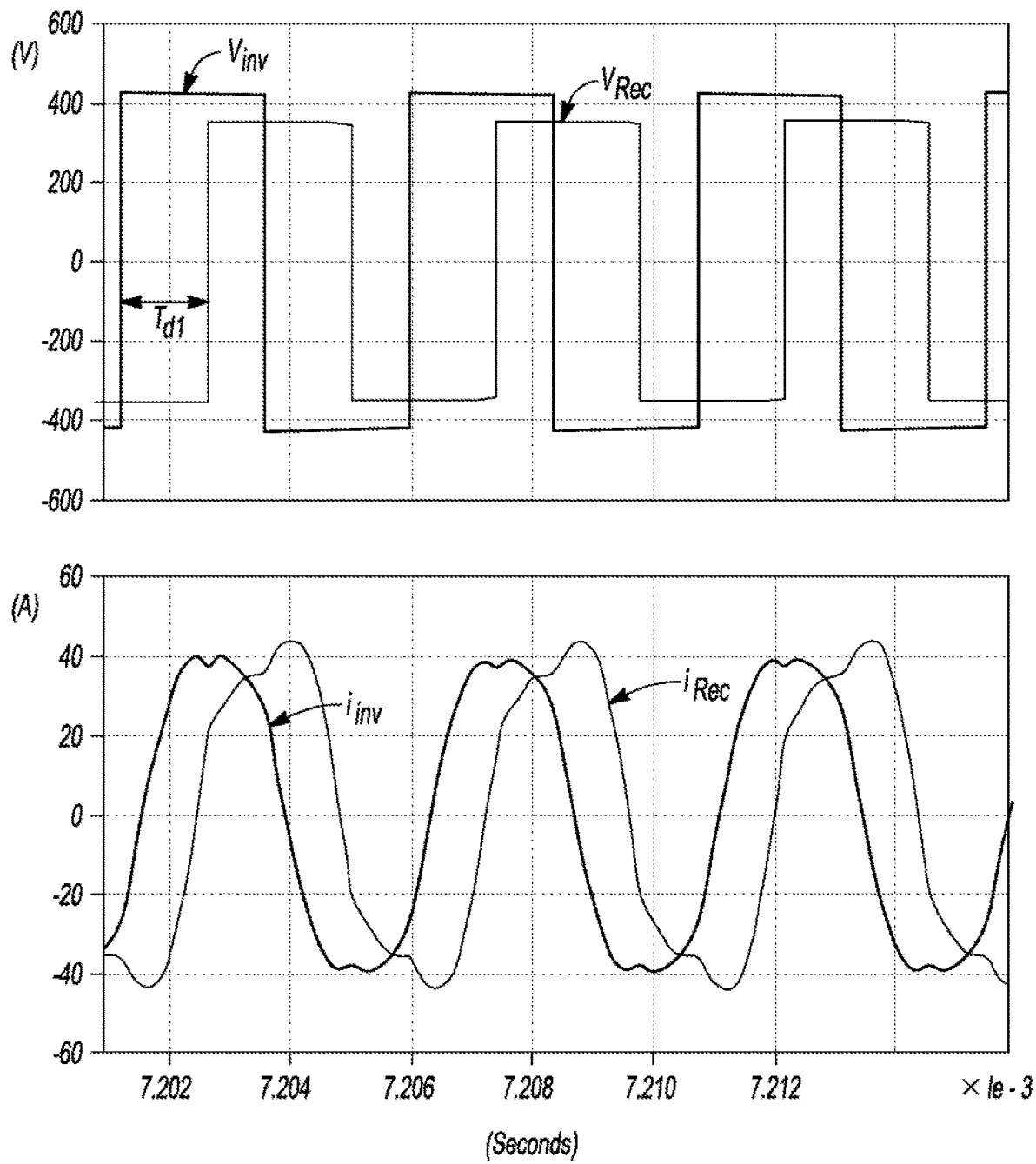

Salient waveforms are provided. Bidirectional power flow between the AC grid 41 and HV battery 24 is realized by controlling the time delay $T_d$, between the PWM signals provided to the dual active bridges (DABs) 45, 60. FIG. 5 shows the AC port characteristics of the DABs 45, 60 for the case when power delivered to the LV battery 26 is 2 kW and 0W. This time delay is unaffected by the power delivered to the LV battery 26. The CLC resonant network 54 and flux path decoupling approach are effective in decoupling the load dynamics between the HV battery 24 and LV battery 26 when the AC grid 41 is the source. Hence, independent control of the power delivered to both of the batteries 24, 26 is achieved.

Figure 6A:
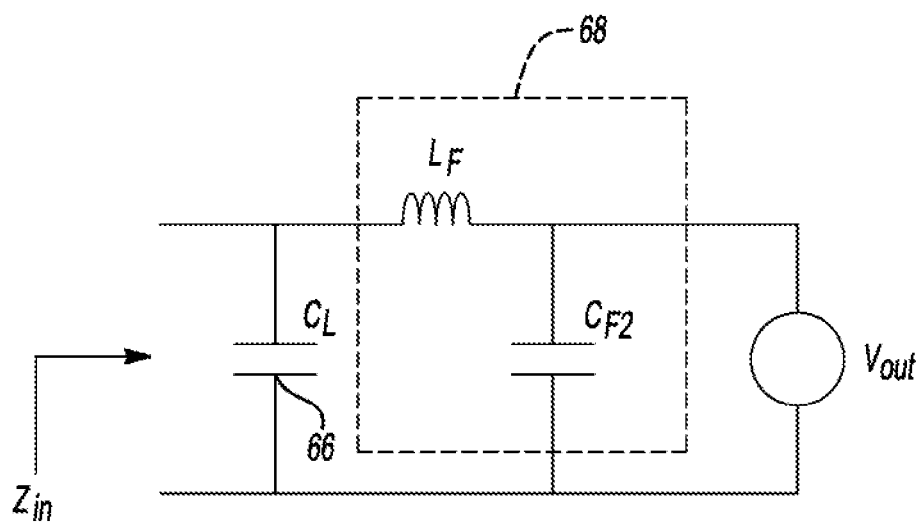
FIG. 6A shows connection of a resonant capacitor at the input of an output low pass filter.
Figure 6B:
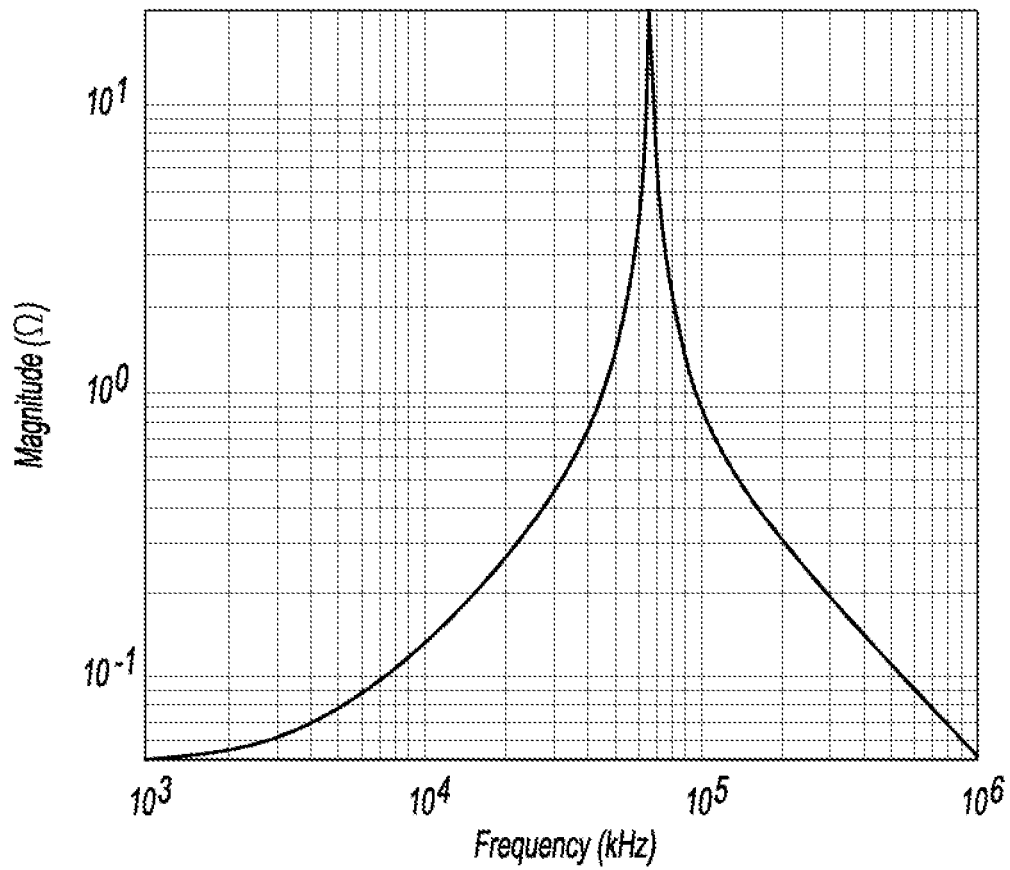
FIG. 6B shows a plot of network input impedance magnitude versus frequency.

The LV resonant buck converter 64 is designed to realize bidirectional power flow between the AC source 41, or the HV battery 24 and LV battery 26. In order to reduce the reactive power circulation in the LV coil 38, the resonant capacitor 66 is added to match the LV coil reactance to the output filter reactance. FIGS. 6A and 6B show the input impedance of the output filter 68. By adding the resonant capacitor 66, the impedance loading the LV coil 38 appears to be capacitive at the switching frequency. The resonant capacitor 38 is optimized to minimize reactive power circulation in the LV coil 38, thus improving the efficiency of the integrated charger.

Figure 7A:
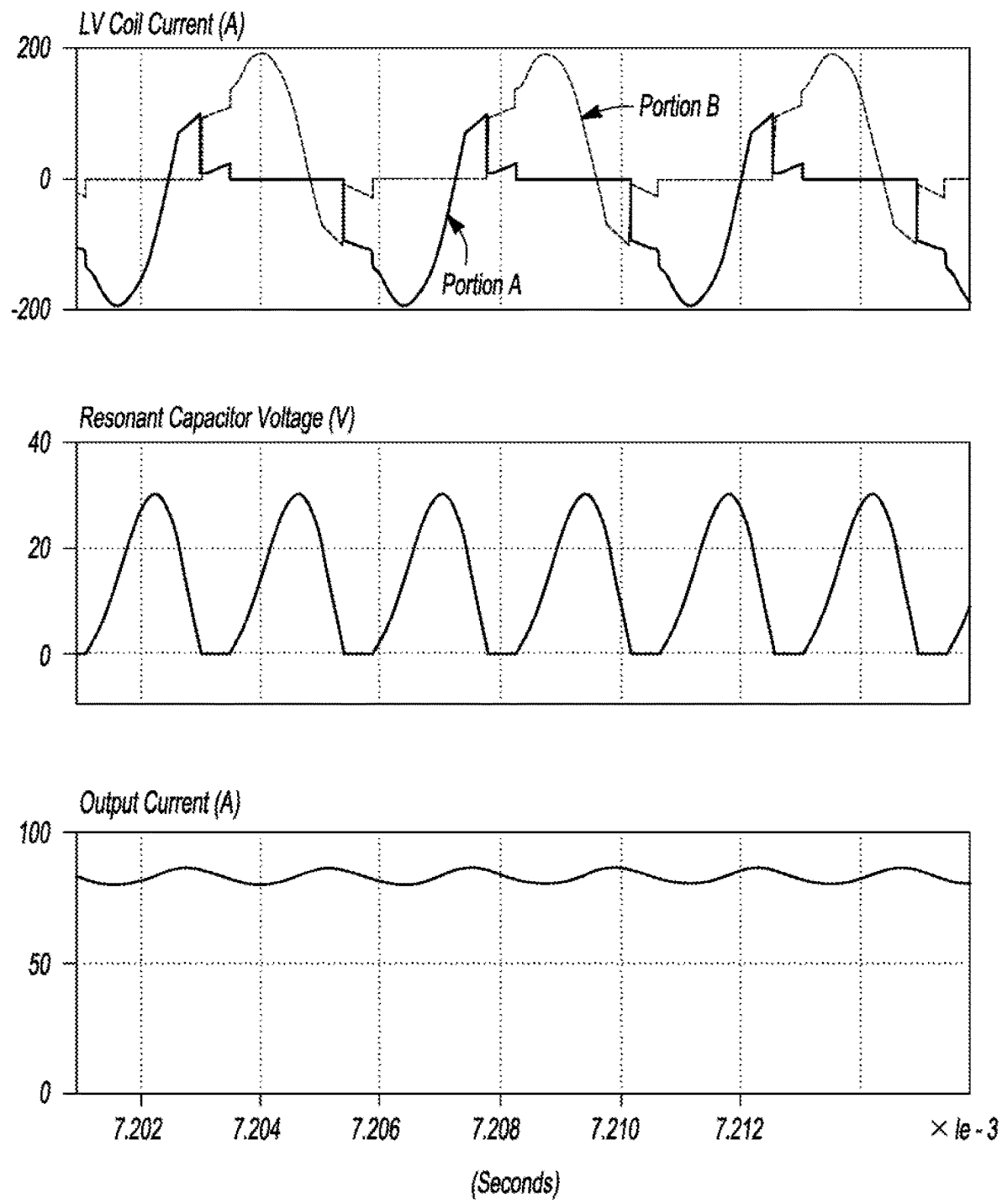
FIGS. 7A and 7B are coil current, resonant capacitor voltage, and output current plots for low voltage circuitry.
Figure 7B:
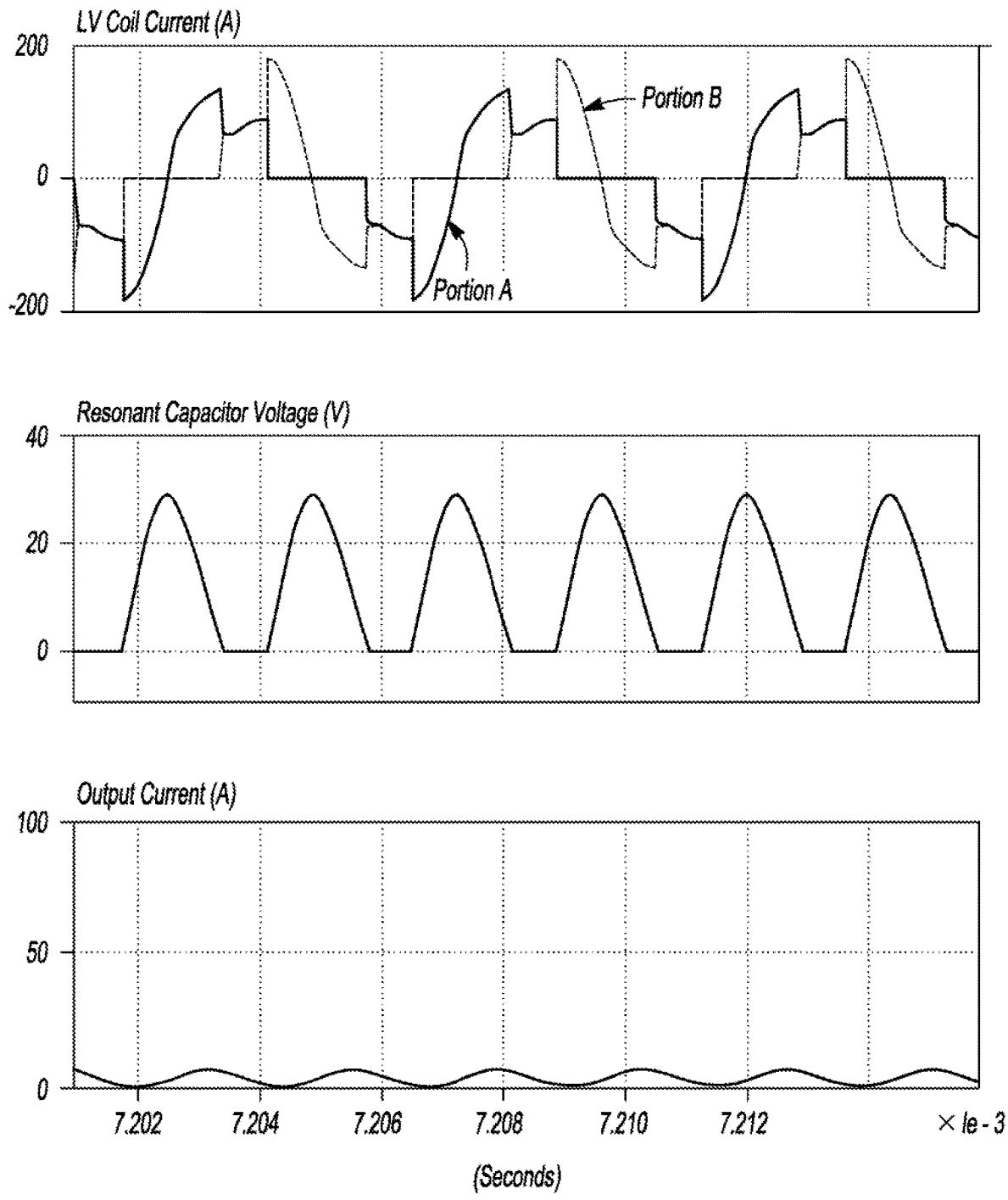
Figure 8A:
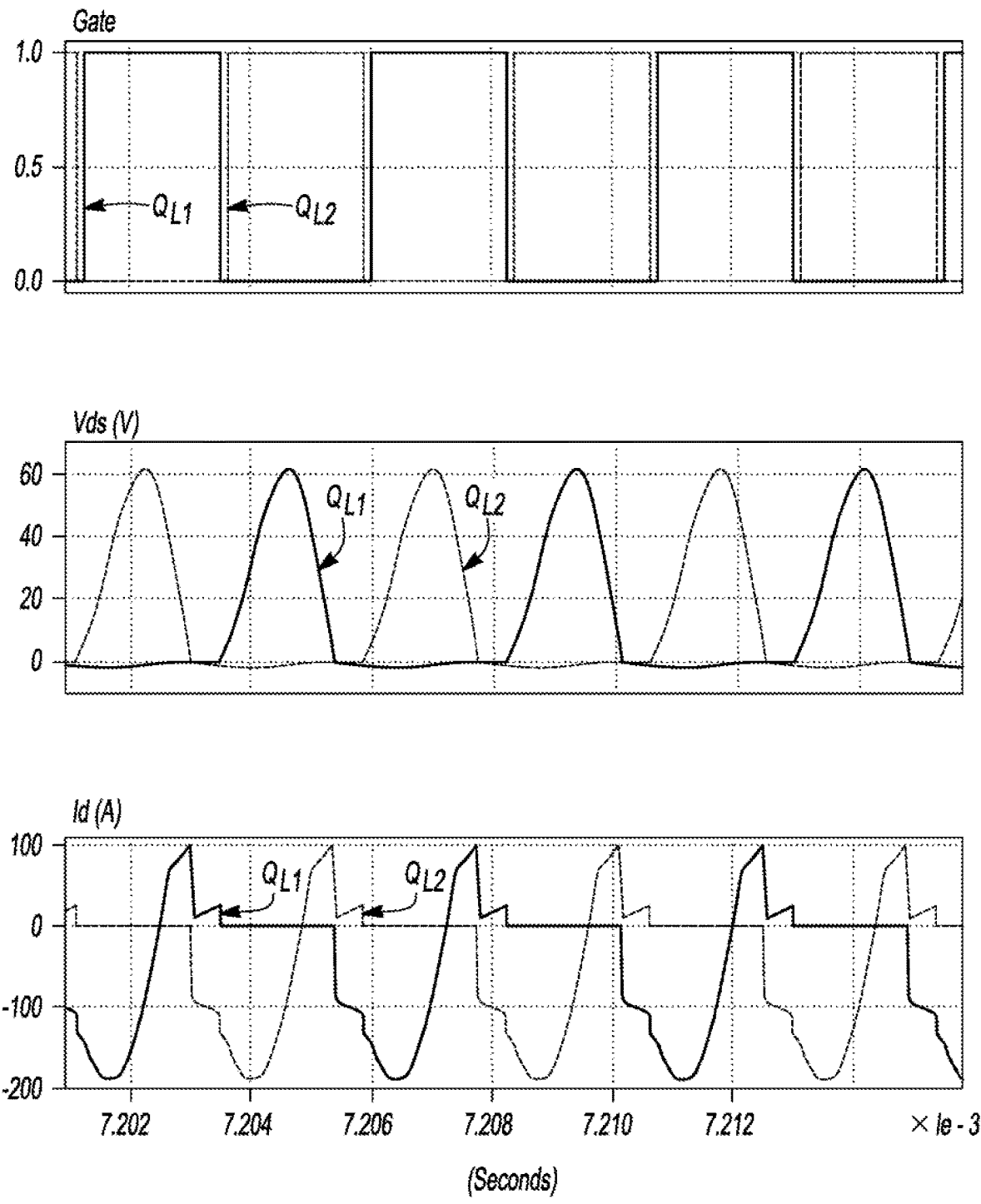
FIGS. 8A and 8B are gate command, voltage, and current plots for metal-oxide semiconductor field-effect transistors of an active bridge of the low voltage circuitry of FIGS. 7A and 7B.
Figure 8B:
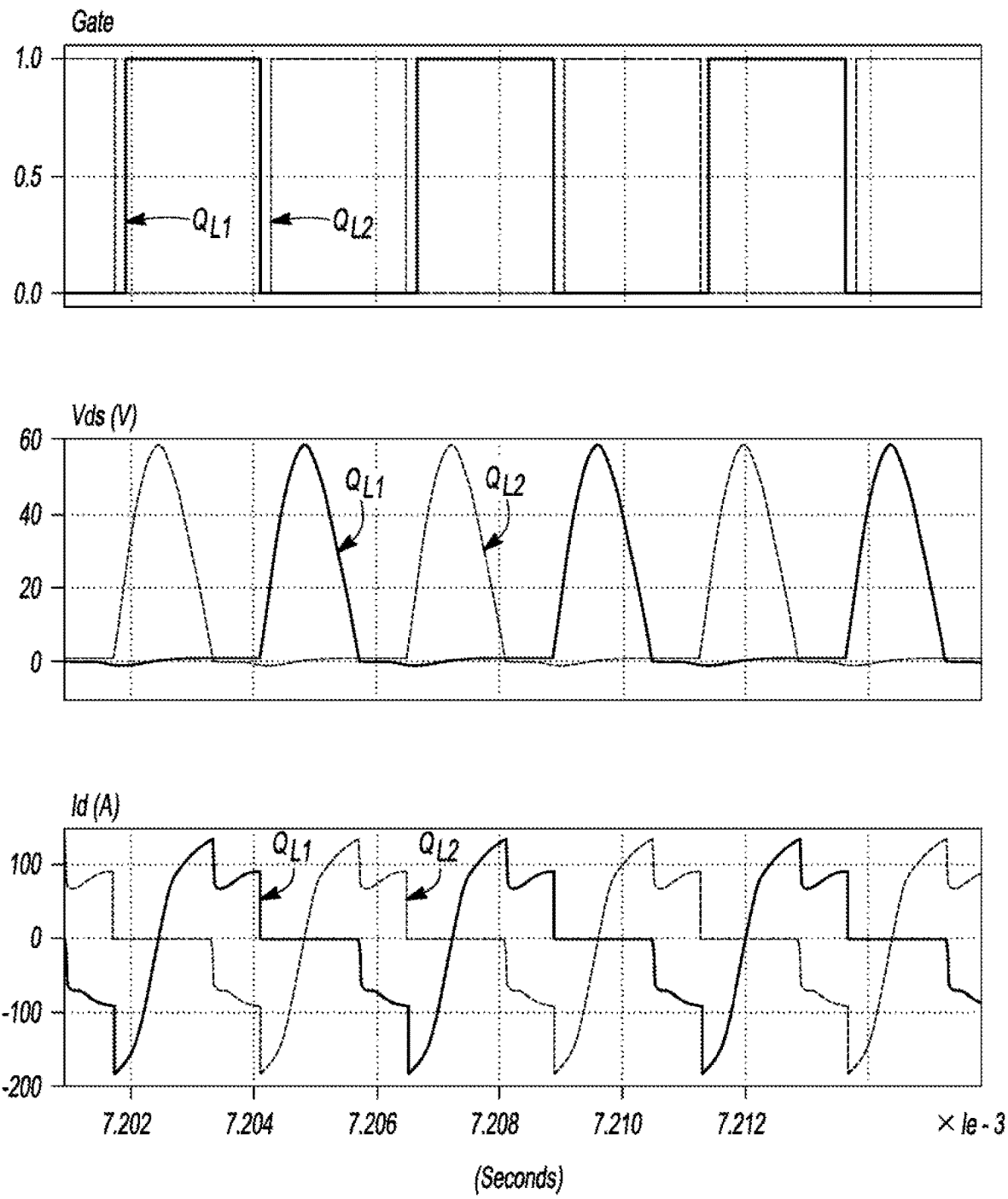

In order to illustrate the operation of the resonant buck converter 64, FIGS. 7A and 7B are provided to show the current in the LV coil 38, and the voltage across the resonant capacitor 66 for the case when power delivered to the LV battery 26 is 1 kW and 0 kW. Controlling the delay time between the PWM signal provided to the LV switches 64 and grid switches 45, the LV battery power is controlled independently from the HV battery 24. The resonant capacitor voltage is allowed to resonant with the LV coil current. Thus, its voltage contains a large AC component. FIGS. 8A and 8B are provided to show that by adding the resonant capacitor 66, the switch current is maintained low. When no power is delivered to the LV battery 26, the LV switches 64 conduct forward current to increase the reactance mismatch between the LV coil 38 and its load reactance.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
   a traction battery;
   an auxiliary battery;
   a matrix transformer including two separate cores, a primary winding wound around each of the cores, a first secondary winding wound around one of the cores, and a second secondary winding galvanically isolated from the first secondary winding and wound around the other of the cores;
   circuitry configured to transfer power from an AC source to the primary winding, to transfer power from the first secondary winding to the traction battery, and to transfer power from the second secondary winding to the auxiliary battery, wherein the circuitry includes a first active bridge having a switching frequency range, and a pair of series connected capacitors and an inductor center tapping the capacitors to form a capacitor-inductor-capacitor resonant network electrically connected between the first active bridge and primary winding and tuned to have a resonant frequency defined by the switching frequency range; and
   a controller configured to operate the first active bridge to maintain a magnitude of current through the primary winding constant independent of load variation at the first and second secondary windings.

2. The automotive power system of claim 1, wherein the circuitry includes a second active bridge, a DC output filter capacitor, and matching network circuitry configured to match an output impedance of the matrix transformer to an input impedance of the second active bridge.

3. The automotive power system of claim 2, wherein the circuitry includes a third active bridge, a resonant capacitor, and an inductor-capacitor low pass filter configured to match an output impedance of the third active bridge to an input impedance of the inductor-capacitor low pass filter, wherein the third active bridge is a center tapped active bridge, and wherein the resonant capacitor is electrically connected in parallel with the inductor-capacitor low pass filter at a center tap of the center tapped active bridge such that under zero load conditions at the second secondary winding, current through the second secondary winding and the center tapped active bridge is greater than zero to permit the controller to maintain the magnitude of current through the primary winding constant independent of load variation at the first and second secondary windings.

4. The automotive power system of claim 3, wherein the resonant capacitor is tuned to resonate with the inductor-capacitor low pass filter such that a load impedance of the third active bridge is capacitive during operation of the third active bridge within the switching frequency range.

5. The automotive power system of claim 3, wherein the controller is further configured to operate the second and third active bridges such that a delay time between pulse width modulated gate signals of the second active bridge and pulse width modulated gate signals of the first active bridge is independent of a delay time between pulse width modulated gate signals of the third active bridge and the pulse width modulated gate signals of the first active bridge.

6. The automotive power system of claim 1, wherein the circuitry further includes a bidirectional inverter, and a DC link capacitor between the bidirectional inverter and first active bridge.

7. An automotive power system comprising:
a traction battery;
an auxiliary battery;
a matrix transformer including two separate cores, a primary winding wound around each of the cores, a first secondary winding wound around one of the cores, and a second secondary winding galvanically isolated from the first secondary winding and wound around the other of the cores;
primary circuitry configured to transfer power from an AC source to the primary winding;
first secondary circuitry configured to transfer power from the first secondary winding to the traction battery; and
second secondary circuitry including a center tapped active bridge, a resonant capacitor, and an inductor-capacitor low pass filter configured to match an output impedance of the center tapped active bridge to an input impedance of the inductor-capacitor low pass filter, wherein the second secondary circuitry is configured to transfer power from the second secondary winding to the auxiliary battery, and wherein the resonant capacitor is electrically connected in parallel with the inductor-capacitor low pass filter at a center tap of the center tapped active bridge such that under zero load conditions at the second secondary winding, current through the second secondary winding and the center tapped active bridge is greater than zero.

8. The automotive power system of claim 7, wherein the primary circuitry includes a bidirectional inverter, a first active bridge having a switching frequency range, a DC link capacitor between the bidirectional inverter and first active bridge, and a pair of series connected capacitors and an inductor center tapping the capacitors to form a capacitor-inductor-capacitor resonant network electrically connected between the first active bridge and primary winding and tuned to have a resonant frequency defined by the switching frequency range, further comprising a controller configured to operate the first active bridge to maintain a magnitude of current through the primary winding constant independent of load variation at the first and second secondary windings.

9. The automotive power system of claim 8, wherein the resonant capacitor is tuned to resonate with the inductor-capacitor low pass filter such that a load impedance of the center tapped active bridge is capacitive during operation of the center tapped active bridge within the switching frequency range.

10. The automotive power system of claim 8, wherein the first secondary circuitry includes a second active bridge, a DC output filter capacitor, and matching network circuitry configured to match an output impedance of the matrix transformer to an input impedance of the second active bridge.

11. The automotive power system of claim 10, wherein the controller is further configured to operate the second active bridge and center tapped active bridge such that a delay time between pulse width modulated gate signals of the second active bridge and pulse width modulated gate signals of the first active bridge is independent of a delay time between pulse width modulated gate signals of the center tapped active bridge and the pulse width modulated gate signals of the first active bridge.

12. An automotive power system comprising:
a traction battery;
an auxiliary battery;
a matrix transformer including two separate cores, a primary winding wound around each of the cores, a first secondary winding wound around one of the cores, and a second secondary winding galvanically isolated from the first secondary winding and wound around the other of the cores;
circuitry, configured to transfer power from an AC source to the primary winding, including a bidirectional inverter, a first active bridge having a switching frequency range, a DC link capacitor between the bidirectional inverter and first active bridge, and a pair of series connected capacitors and an inductor center tapping the capacitors to form a capacitor-inductor-capacitor resonant network electrically connected between the first active bridge and primary winding and tuned to have a resonant frequency defined by the switching frequency range;
a controller configured to operate the first active bridge to maintain a magnitude of current through the primary winding constant independent of load variation at the first and second secondary windings;
circuitry, configured to transfer power from the first secondary winding to the traction battery, including a second active bridge, a DC output filter capacitor, and matching network circuitry configured to match an output impedance of the matrix transformer to an input impedance of the second active bridge; and
circuitry, configured to transfer power from the second secondary winding to the auxiliary battery, including a third active bridge, a resonant capacitor, and an inductor-capacitor low pass filter configured to match an output impedance of the third active bridge to an input impedance of the inductor-capacitor low pass filter, wherein the third active bridge is a center tapped active bridge, and wherein the resonant capacitor is electrically connected in parallel with the inductor-capacitor low pass filter at a center tap of the center tapped active bridge such that under zero load conditions at the second secondary winding, current through the second secondary winding and the center tapped active bridge is greater than zero to permit the controller to maintain the magnitude of current through the primary winding constant independent of load variation at the first and second secondary windings.

13. The automotive power system of claim 12, wherein the resonant capacitor is tuned to resonate with the inductor-capacitor low pass filter such that a load impedance of the third active bridge is capacitive during operation of the third active bridge within the switching frequency range.

14. The automotive power system of claim 12, wherein the controller is further configured to operate the second and third active bridges such that a delay time between pulse width modulated gate signals of the second active bridge and pulse width modulated gate signals of the first active bridge is independent of a delay time between pulse width modulated gate signals of the third active bridge and the pulse width modulated gate signals of the first active bridge.

* * * * *